May 26, 1959 J. P. PAHUD 2,888,581
SUPERSONIC WAVE TRANSDUCERS
Filed Nov. 22, 1954 3 Sheets-Sheet 1
Fig. 1
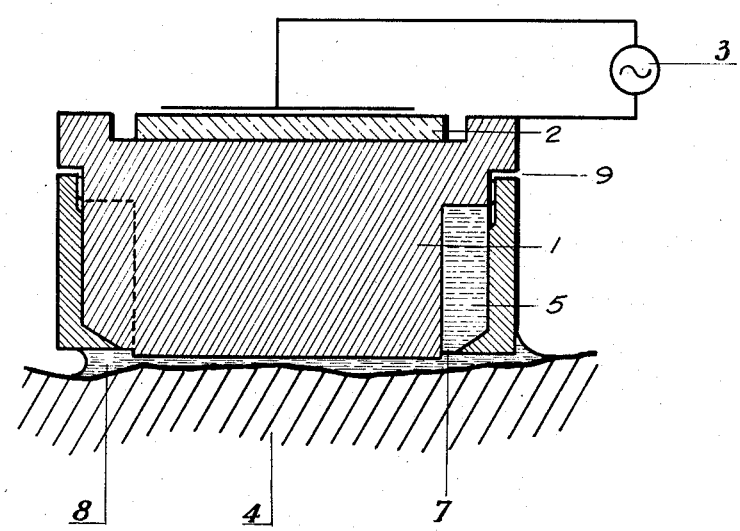
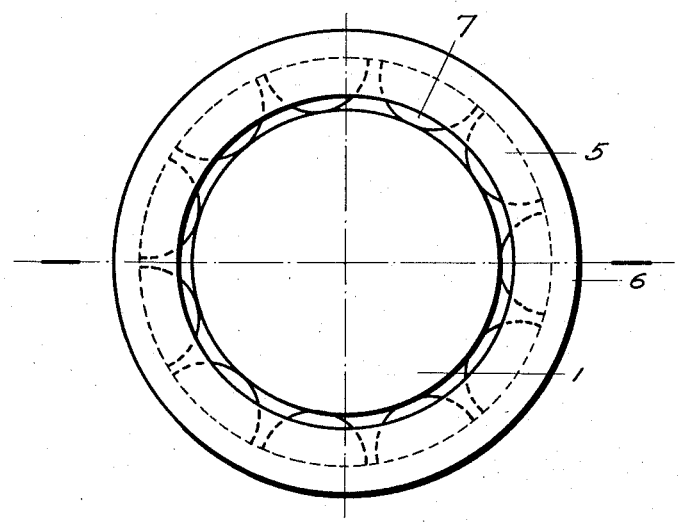
Fig. 2

May 26, 1959        J. P. PAHUD        2,888,581
SUPERSONIC WAVE TRANSDUCERS

Filed Nov. 22, 1954        3 Sheets-Sheet 2

May 26, 1959  J. P. PAHUD  2,888,581
SUPERSONIC WAVE TRANSDUCERS
Filed Nov. 22, 1954  3 Sheets-Sheet 3

2,888,581

SUPERSONIC WAVE TRANSDUCERS

Jacques Philippe Pahud, Mont-sur-Marchienne, Belgium, assignor, by mesne assignments, to Sperry Products, Inc., Danbury, Conn., a corporation of New York Application November 22, 1954, Serial No. 470,420

Claims priority, application France December 14, 1953

2 Claims. (Cl. 310—8.7)

It is known that one of the serious difficulties in the application of supersonics in the control of materials lies in obtaining contact between the transducer which generates or receives the supersonic waves and the piece to be tested, treated or controlled. In fact the transmission of supersonic waves is disturbed by any discontinuity in the acoustic resistivity of the medium of propagation, which is equal to the product of the specific mass of the medium of propagation by the speed of the supersonic waves in the medium. The disturbance consists of a reflection of the incident supersonic wave, which results in a reduction in intensity of the supersonic wave transmitted. It is this reflecting property of the surfaces of discontinuity of acoustic resistivity which makes possible the detection of flaws (blisters, scaling of layers, bubbles, etc.) inside the material. It is therefore important to eliminate reflections due to a faulty contact either in the transmission or reception of the supersonic waves, so as to bring out those arising from internal flaws in the material. In particular it is desirable to eliminate any air film between the transmitter-transducer or transducer receiver and the piece to be examined.

According to practice followed up to now, the material to be examined is coated with an intermediate liquid such as water, oil, glycerine, etc. or a grease, the acoustic resistivity of which (of the order of $10^5$ gr./sec. sq. cm.) is much closer to that of a solid (of the order of $10^6$ gr./sec. sq. cm.) than is that of air (of the order of 40 gr./sec. sq. cm.) and which thereby considerably reduces the reflection of the supersonic waves entering and leaving the piece to be examined. The intermediary substance is applied either before examination, during preparation of the piece, or during the examination itself by using special transducers with a device which, by being connected with a distribution system (of water, for example) continuously wets the piece with the intermediate liquid.

An object of the present invention is to retain the advantage offered by a continuously renewed film of liquid, while eliminating the drawback of the necessity of connecting it to a distribution system of an intermediary liquid. It is particularly applicable to portable supersonic inspection devices which are used for field work. In addition, the invention makes it possible to keep the layer of liquid from "tearing," when the transducer is moved over the surface of the piece to be examined, particularly when this surface is irregular. This avoids the need of machining a piece for inspection by ultrasonics.

According to the invention, an ultrasonic transducer with liquid reservoir is characterized in that:

(1) A film of an intermediary liquid applied between a piece to be probed and an element to emit, transmit or receive supersonic waves, is connected permanently to at least one reservoir of an intermediary liquid by at least one narrow conduit opening at the edge of the contact surface of the element for emitting, transmitting or receiving supersonic waves, the reservoir or reservoirs and the conduit or conduits which provide communication between the intermediate liquid film and said reservoirs being of such a small size that the capillary forces acting in the reservoirs and in the narrow conduits are sufficient to prevent any substantial run-off of the said intermediary liquid, at least while the transducer is applied to the wet surface of a material to be tested, examined or treated.

(2) The said reservoir or reservoirs are fixed with respect to the elements for emitting, transmitting or receiving ultrasonic waves.

(3) The said reservoir or reservoirs are connected to the elements for emitting, transmitting or receiving the supersonic waves by means of flexible element allowing a certain amount of movement of the reservoirs with respect to the said elements for emitting, transmitting or receiving the ultrasonic waves.

(4) Narrow conduits are provided inside a part surrounding the edges of the contact surfaces of the said element for emitting, transmitting or receiving the supersonic waves.

Other characteristics and advantages of the invention will be presented in the following description of preferred embodiments of the invention which are shown by way of example in the accompanying drawings in which—

Fig. 1 is an axial section of a transducer according to the invention.

Fig. 2 is a plan of said transducer.

In all the figures the same reference numbers designate the same elements.

Figure 3:
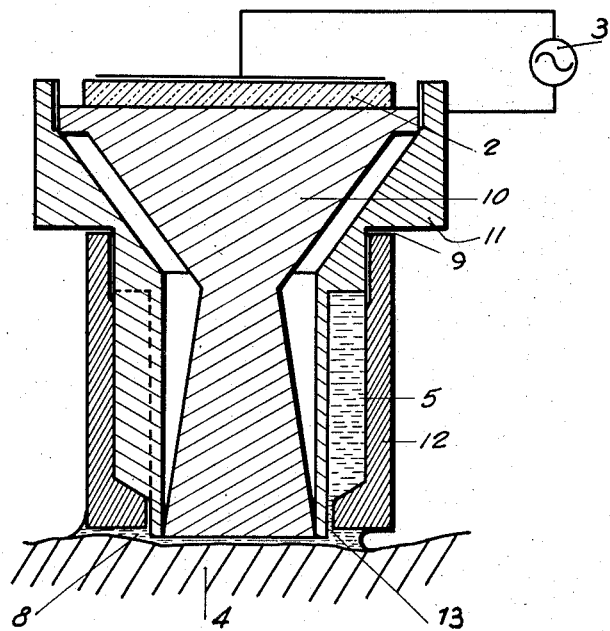
Fig. 3 is an axial section of a directive transducer according to the invention.

In Figs. 1 and 2, a member 1 transmits ultrasonic waves between an electro acoustic element 2, for example a quartz disc connected to a high-frequency generator 3 and a piece of material to be inspected 4. The lower portion of the periphery of the member 1 is grooved to provide a plurality of reservoirs 5 closed by a flanged ring 6 which surrounds the member 1 and leaves orifices 7 open at the bottoms of the reservoirs. A liquid stored in the reservoirs 5 is in continuous contact with a film 8 of the liquid applied between ring 6 and member 1 on the one hand and on the other hand the material 4 undergoing inspection. The ring 6 and member 1 are joined by means of a joint 9 which is not air tight. The film 8 transmits the supersonic waves from piece 1 to the material for inspection 4, or vice versa. The member 1 projects somewhat beyond ring 6 as indicated at 1 so that ring 6 does not come into contact with the surface of the material 4 to be inspected even if the surface of this material is irregular. When the transducer according to Fig. 1 is moved over a rough surface for example over the surface of a rough rolling billet, the local thickness of film 8 varies constantly, but since this film 8 is in permanent communication with the reservoirs 5 these variations are always compensated by the reserve of liquid.

The dimensions of the reservoirs 5, orifices 7 and ring 6 are selected preferably in such a way that, when the transducer is in contact with a piece to be examined 4, the liquid does not run out by its own weight, and so that the latter is retained by capillary action acting both in the reservoirs and the orifices as well as, and particularly in the annular space defined by ring 6 on the one hand and the material 4 on the other. The joint 9 which is not air tight allows a flow of the liquid without a vacuum in the reservoirs.

A like device can be used for probing curved-surface pieces 4, and in this case the member 1 will have a radius of curvature similar to that of piece 4.

Figure 4:
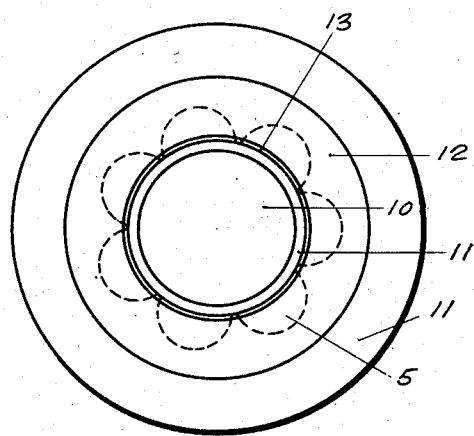
Fig. 4 is a plan of the transducer shown in Fig. 3.

In Figs. 3 and 4, the surfaces of a biconic member 10 reflect the beam of supersonic waves in such a way as to send into the inspected material 4 a more concentrated beam than the one sent out directly by the quartz crystal 2. As it is important in this case to safeguard the reflecting property of the conical surfaces of the piece 10, the latter is surrounded by an air space enclosed by an annular member 11. The member 11 has grooves and cooperates with a ring 12 to form a multitude of reservoirs 5 all opening into a tiny ring-shaped slot 13 and thus placed in communication with film 8.

Figure 5:
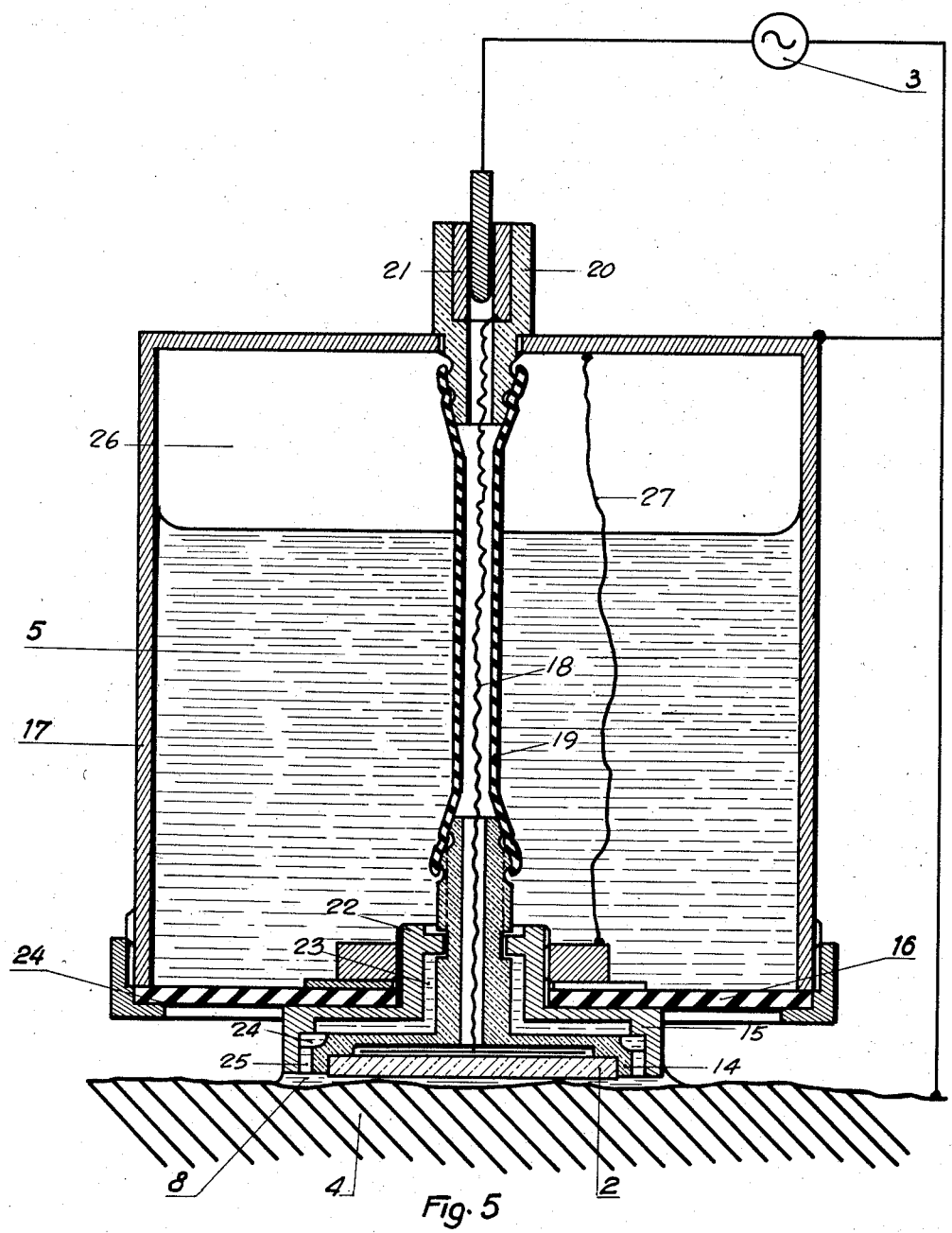
Fig. 5 is an enlarged axial section of a construction in which the liquid reservoir is flexibly mounted with respect to the transducer.

In Fig. 5 a crystal or a piezoelectric ceramic 2 is applied directly to the material for inspection without intervention of a transmitter member. Crystal 2 is held in an insulating cup-shaped member 14 which is surrounded by a cupola 15. This cupola 15 is fixed to a rubber membrane 16, and the rubber membrane 16 and cupola 15 close one side of a hollow cylinder 17 which defines a reservoir of liquid 5. With this arrangement the liquid reservoir is flexibly mounted with respect to the transducer. The piezoelectric crystal 2 is connected to a generator 3 by a high tension conductor 18. This passes through the reservoir 5 inside an insulating tube 19 connecting the insulating member 14 to an insulating terminal 20 opposite to the said insulating member 14 with respect to cylinder 17, and which surrounds a connector 21. The intermediary liquid forming a film 8 between a material for inspection 4 and the piezoelectric crystal 2 is in permanent comunication with a reserve of this liquid contained in reservoir 5. For this purpose, the insulating member 14 is united with the cupola 15 by means of bayonet socket 22 which does not completely block the annular space 23 between member 14 and cupola 15. Member 14 has a shoulder 24, small channels milled in this shoulder permitting communication of the ring-shaped space 23 with another tiny space 25 between insulating member 14 and cupola 15. Thus the film of liquid 8 is in permanent communication with the reservoir 5 through ring-shaped space 25, the channels of the shoulder 24 and the ring-shaped space 23.

To avoid having the intermediary liquid produce a vacuum as it runs out, it is only necessary not to fill reservoir 5 completely and thereby provide a volume of air 26 which expands in the very slow course of reduction of the reserve of intermediate liquid in service.

The generator 3 is connected on the one hand to the transducer and on the other to the cylinder 17 and the inspected material 4 which constitutes the electrode applied to the body of the piezoelectric element 2. A flexible wire 27 connects the applied cylinder 17 to the mass of the cupola 15.

In order to obtain proper capillary action, the passageways and the viscosity of the intermediate liquid must be chosen adequately. While in the devices connected to a distribution system, the preferred intermediate liquid is water, in the present device the preferred liquid is oil. Oil has the advantage of being obtainable in any desired viscosity range and it is a noncorrosive liquid. Thus, while the present invention may be used with any suitable liquid, when the liquid is oil, it is particularly adapted to test metallic parts or other solids not dissolved by oil.

To assure the above mentioned capillary action in a device like that of Fig. 5 the passageways 23 and 25 may be annular or ring shaped spaces whose height and thickness is of the order of 0.3 mm. and an oil of viscosity of 3 poises may be used.

A transducer with a reservoir of liquid according to the present invention permits probing materials with irregular surfaces such as raw rolling billets without the necessity of an abundant source of intermediate liquid. The only substantial loss of liquid that is suffered is due to the wetting of the surface, but when the surface has already been wetted with the intermediary liquid, the transducer no longer loses liquid when it is moved over the surface of the material to be probed due to capillary action which retains the liquid film. Any variation in the volume of the film of this intermediary liquid is compensated by the reserve of liquid. In this way the transducers can serve for the supersonic probing of materials in the field.

It is desirable to cover the transducer with a tight lid to avoid run-off of the liquid in the course of transport.

Since various changes may be made in the foregoing constructions and different embodiments of the invention may be arranged without departing from the true scope thereof, it is intended that the illustrated embodiments not be considered in a limiting sense. It is aimed to define the scope of invention in the following claims.

What I claim and desire to secure by Letters Patent is:

1. In an ultrasonic wave transducer, an electroacoustic member, fluid means to transmit ultrasonic waves between said electroacoustic member and an inspection-piece, means to contain said fluid means, a plurality of conduits in said fluid containing means providing a fluid flow path between said fluid containing means and said inspection piece, said conduits having their geometry and dimensions suitably selected for the viscosity and surface tension of said fluid means so as to produce selective retaining forces by capillary action and so as to maintain at least a fluid film between said electroacoustic member and the inspection-piece, said fluid containing means including a hollow cylinder having substantially closed ends, a flexible member enclosing one end, said cylinder end being the end to be placed adjacent an inspection-piece, a cupola-shaped member attached to said flexible member and extending into the cylinder and outwardly thereof, an insulating member carrying said electroacoustic member and being in turn carried axially by said cupola-shaped member and extending into the cylinder, said cupola-shaped member and said insulating member being radially spaced relative one another, an insulated connector attached to the other end of said cylinder and extending into the cylinder and outwardly thereof, a flexible conduit being disposed internally in said cylinder and connecting said insulated connector and said insulating member carrying said electroacoustic member, electrical connection means being disposed in said conduit and connecting said electroacoustic member and said insulated connector, fluid conduit means between the interior of said hollow cylinder and the exterior, said conduit means being disposed between said cupola-shaped member and said insulating member.

2. A supersonic wave transducer in accordance with claim 1, in which said insulating member to carry said electroacoustic member comprises a cup-shaped member disposed in said cupola-shaped member, said cup-shaped member having a circumferential external shoulder abutting and engaging an offset on said cupola-shaped member, and said fluid conduit means comprises a plurality of channels of a predetermined dimension and configuration on said shoulder of said insulating member.

References Cited in the file of this patent

UNITED STATES PATENTS

| | | |
|---|---|---|
| 2,545,309 | Roberts | Mar. 13, 1951 |
| 2,592,134 | Firestone | Apr. 8, 1952 |

FOREIGN PATENTS

| | | |
|---|---|---|
| 894,737 | France | Mar. 20, 1944 |

OTHER REFERENCES

The Iron Age, June 8, 1944, pp. 60, 61, "Sheet Fractures Detected With Supersonics."